March 24, 1970    R. B. HARTMAN    3,502,107
ELECTRIC TO FLUIDIC TRANSDUCER
Filed Nov. 14, 1967
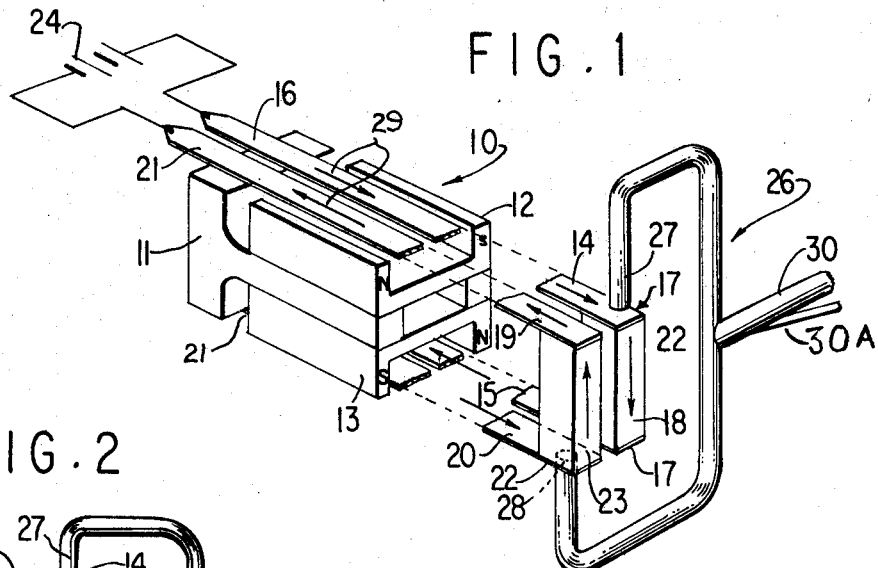
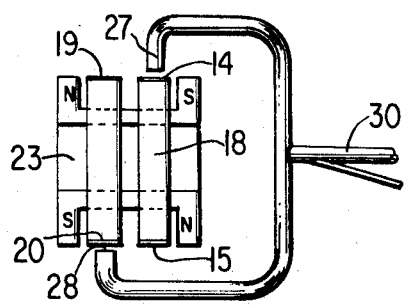
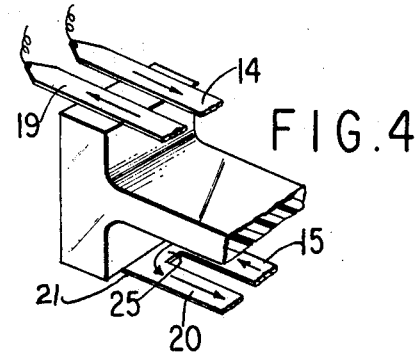
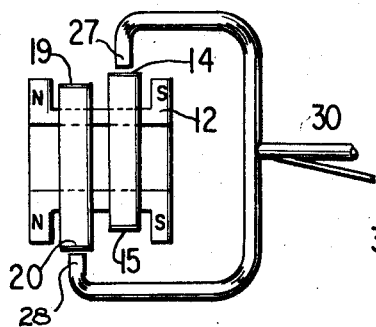
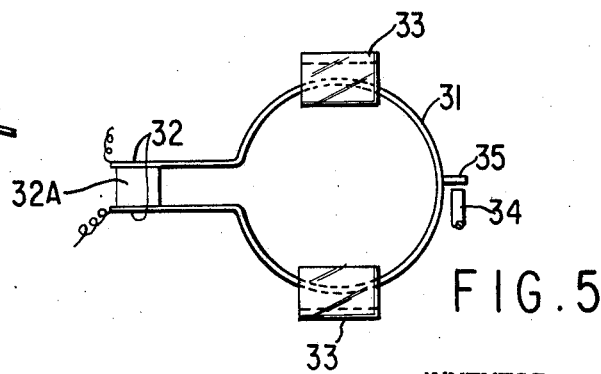
INVENTOR
ROBERT B. HARTMAN
BY D. Verner Smythe
ATTORNEY United States Patent Office 3,502,107
Patented Mar. 24, 1970

3,502,107
ELECTRIC TO FLUIDIC TRANSDUCER
Robert B. Hartman, Bridgeport, Conn., assignor to Remington Arms Company, Inc., Bridgeport, Conn., a corporation of Delaware
Filed Nov. 14, 1967, Ser. No. 682,892
Int. Cl. F17d 3/02
U.S. Cl. 137—612.1                                11 Claims

ABSTRACT OF THE DISCLOSURE

An electric to fluidic transducer with a flexible electrically conductive loop mounted for movement in a magnetic field when an electric current is passed through the conductive loop and a fluidic sensing device adjacent the flexible loop and responsive to the deflection thereof.

---

The present invention relates to a transducer for converting an electric signal to a fluidic signal and more particularly to an arrangement for moving a flexible member in a magnetic field in response to an electric signal so as to produce a corresponding fluidic signal such as by a fluidic back pressure sensing device.

A wide variety of devices have been employed for converting one type of signal or motion into another type of signal. In one such type of device, an electric signal is converted to a fluidic or to a pneumatic signal. A common form of such an arrangement applies the electric signal to be converted to a coil movable in a magnetic field with the displacement of the coil due to variations in the magnitude of the electric signal producing an unbalancing force on a force balance beam. The displacement of the beam will vary the spacing between a nozzle fluidic couple. The use of such a force beam is not entirely satisfactory for a number of reasons. One disadvantage is the difference in relative magnitudes of the forces applied to the beam by the movable coil and by a restoring spring or bellows.

It is therefore an object of the present invention to provide an improved transducer for converting an electric signal to a fluidic signal.

It is another object of the present invention to provide a simple but accurate structure movable in response to an electric signal to produce a fluidic signal.

In one aspect of the present invention, the electric to fluidic transducer may comprise a support means and a means spaced therefrom for producing a magnetic field. A flexible electrically conductive member, which may be in the form of a loop, has an open end rigidly fixed on the support means for movement relative to the support means across the magnetic field. The flexible member may be connected to a source of electric energy whereby electric current flowing therethrough will cause a resultant force to deflect the flexible member. A fluidic sensing device is positioned adjacent the flexible member and is responsive to the deflections thereof.

The flexible member may comprise a pair of parallel strips with spaced ends with their one ends fixed to an insulating block comprising the support means and their other ends connected by a rigid electrically conductive block of the same thickness so that the other ends define a rectilinear movement.

Other objects, advantages and features of the present invention will be apparent from the accompanying description when taken in conjunction with the following drawings, which are exemplary.

In the drawings:

FIG. 1 is an overall perspective view of the transducer according to the present invention;

FIG. 2 is an end elevational view of the transducer of FIG. 1 showing the position of the flexible strips with respect to the fluidic back pressure sensors when no current is flowing through the strips;

FIG. 3 is a view similar to that of FIG. 2 but showing the position of the strips when a current is flowing therethrough;

FIG. 4 is a perspective view of the supporting block portion of the transducer as illustrated in FIG. 1 with the flexible strips being cut away to show the manner in which the strips are attached on the supporting block; and FIG. 5 is a side elevational view of a modification of the transducer of FIG. 1 wherein a flexible loop is employed instead of the two pairs of flexible strips.

Proceeding next to the drawings, like reference symbols will be used to indicate the same parts throughout the various views.

In FIG. 1 there is illustrated the transducer of the present invention indicated generally at 10. The transducer comprises a supporting block 11 of an electrically insulating material and spaced permanent magnets 12 and 13 with their poles arranged as illustrated in order to produce a magnetic field across the flexible members. A first pair of spaced parallel strips 14 and 15 have their inner ends 16 fixed to the insulating support block 11. The strips 14 and 15 are of a flexible electrically conductive material and the outer ends 17 are spaced with an electrically conducting block 18 connecting the spaced outer ends.

A second pair of similar flexible electrically conducting strips 19 and 20 have their inner ends 21 fastened to the insulating support block 11 and their outer ends 22 spaced and connected by a rigid electrically conducting block 23.

The inner ends of the lower flexible strips 15 and 20 are connected by a bridge such as 25 so as to form an electrically conductive path between strip 15 and strip 20.

The inner ends of the strips 14 and 19 are connected to a source of electric energy 24 which may be direct current. The current will then pass through the four flexible strips. The magnets 12 and 13 may be permanent magnets. Where alternating current is used, the alternating current may be rectified or alternating current electromagnets used in place of permanent magnets 12 and 13.

A fluidic sensing device indicated generally at 26 is positioned adjacent the outer ends of the flexible strips. The sensing device comprises an orifice 27 positioned adjacent the upper surface of strip 17 and a second orifice 28 positioned adjacent the lower surface of strip 20. The relationship of the nozzles 27 and 28 to their respective flexible strips without any current flowing through the flexible strips will be as illustrated in FIG. 2.

When an electric current is passed through the flexible conducting strips in the direction indicated by the arrows 29 on the strips and the rigid connecting blocks, there will be a resulting deflection of the flexible strips in the magnetic fields as illustrated in FIG. 3. This deflection is in accordance with the electrical law stating that a resultant force will be produced on an electric conductor perpendicular to the direction of current flow therethrough and to the magnetic flux lines in which the conductor is immersed. The resulting forces produced in the flexible strips will cause the deflection as shown in FIG. 3 and this deflection will be sensed by fluidic orifices 27 and 28. The orifices may be connected through a tubular line 30 which may act as a fluidic back pressure sensor. A tubular line 30A can be connected to 30 as shown so as to conduct the change in back pressure due to deflection of the strips to a conventional pressure responsive means.

The rigid connecting blocks at the outer ends of the flexible strips in conjunction with the rigid connection at the inner ends define or provide a rectilinear movement as resultant forces are produced in the strips. These strips together with the stationary supporting block and the movable rigid block essentially define a pantograph so that the movement of this flexible conducting member is analogous to that of a pantograph.

The arrangement of the preceding figures may be changed to that shown in FIG. 5 wherein the movable flexible conducting member comprises a loop-like member 31 having open end means 32 which are fixed to the stationary insulating supporting block 32A so that the loop 31 is movable with respect to the supporting block 32A. The flexible conductive loop 31 moves in a magnetic field established by either permanent magnets or electromagnets 33 as described for FIG. 1. In a like manner, fluidic sensing means in the form of one or more fludic orifices 34 which cooperate with member 35 will be responsive to the deflections of the flexible loop when an electric current is passed therethrough.

Since the movement of the flexible conductive member is directly proportional to the amount of electric current passed therethrough when a permanent magnet is used where the field is uniform and the spring force constant, the transducer of the present invention may be employed as a fluidic type ammeter. If A.C. electromagnets are employed, an A.C. ammeter will result. It would also be possible to use both a varying input and an independently varying electromagnet so that the fluidic output is proportional to the two independent inputs. Such a device would provide, for example, an electric to fluidic watt meter if the flexible member input is a current in the system and the electromagnetic input is the voltage therein. Also, the arrangement can serve as an alternator or a pulse shaper in accordance with the input.

Thus, it can be seen that the present invention can be a simple but accurate electric to fluidic transducer wherein the movement of the flexible members is proportional or indicative of the amount of electric current flowing therethrough. The deflection of the flexible members is sensed by a fluidic sensing arrangement in the form of one or more orifices so that the resulting fluidic signal is proportional to the input electric signal. Obviously the device may also be used as an electrically operated fluidic switch. Various forms of the movable flexible member may be employed but in all such arrangements the flexible member provides a closed path for the passage therethrough of an electric current. When a pair of flexible members are used, the effects of vibration on the output signal will be reduced.

It is to be understood that various details of construction and arrangement of parts may be made without departing from the spirit of the invention.

What is claimed is:
1. In a transducer for converting an electric signal to a fluidic signal, the combination of support means, means spaced from said support means for producing at least one magnetic field, a flexible electrically conductive member both ends of which are rigidly fixed on said support means and said conductive member is movable relative to said support means and across said magnetic field, said member defining a closed current path from said support means, said flexible member being connected to a source of electric energy whereby electric current flowing therethrough will cause a resultant force to deflect said flexible member, and fluidic sensing means adjacent said flexible member, and spaced from said support means, said fluidic sensing means including means associated with said flexible means and movable relative to a source of pressure to produce a fluidic signal upon deflection of said flexible member relative thereto.

2. In a transducer as claimed in claim 1 with said flexible member comprising a loop having open end portions with said open end portion being fixed to said support means and connected to said current source.

3. In a transducer as claimed in claim 1 with said support means comprising a block of electrically insulating material, said flexible member comprising two parallel strips having their one ends fixed to said insulating block and their other ends connected.

4. In a transducer as claimed in claim 3 with the other ends of said strips being spaced from each other, and a rigid electrically conductive block between said spaced other ends so as to define a rectilinear movement.

5. In a transducer as claimed in claim 3 with said fluidic sensing means being positioned at the opposite end of the flexible member so as to be responsive to the deflection thereof.

6. In a transducer as claimed in claim 3 with there being at least two magnetic field producing means each of which cooperates with at least one of said flexible strips 7. In a transducer as claimed in claim 1 with said support means comprising a block of electrically insulating material, said flexible member comprising two adjacent pairs of parallel strips having their corresponding one ends fixed to said insulating block and their corresponding other ends spaced, and a pair of rigid electrically conductive blocks between the other spaced ends of each pair of parallel strips so as to define a rectilinear movement of each pair of strips.

8. In a transducer as claimed in claim 7 with said fluidic sensing means being positioned adjacent the other end of one strip of one pair and adjacent the other end of the other strip of the other pair.

9. In a transducer as claimed in claim 1, with said magnets being permanent and the electric energy source being varying so as to provide a fluidic output proportional to the electric energy input for producing a varying fluidic output.

10. In a transducer as claimed in claim 1 wherein the electric energy source is a fixed level power supply and the magnetic field is electromagnetic which is varied to provide a desired output waveform.

11. In a transducer as claimed in claim 1 wherein the electric energy source is varying and the magnetic field is varied, the output being the resultant of varying both of said inputs.

References Cited
UNITED STATES PATENTS

| 3,129,587 | 4/1964 | Hallanger | 73—211 |
| 3,187,131 | 6/1965 | Blase | 200—81.8 X |
| 3,296,868 | 1/1967 | Koppel et al. | 73—205 X |
| 3,341,099 | 9/1967 | Jacobsen | 200—81.9 X |

LOUIS K. RIMRODT, Primary Examiner

U.S. Cl. X.R.
200—81.9; 335—51